United States Patent
Maeda et al.

[11] Patent Number: 5,966,409
[45] Date of Patent: Oct. 12, 1999

[54] DATA TRANSMISSION UNIT

[75] Inventors: Hiromi Maeda; Katsunori Suzuki, both of Tokyo, Japan

[73] Assignee: Mitsubishi Denki Kabushiki Kaisha, Tokyo, Japan

[21] Appl. No.: 08/833,129

[22] Filed: Apr. 4, 1997

[30] Foreign Application Priority Data

Nov. 18, 1996 [JP] Japan ................................ 8-306729

[51] Int. Cl.$^6$ ........................................................ H04L 7/00
[52] U.S. Cl. ........................ 375/295; 375/357; 375/369; 370/513; 714/800; 713/400; 713/500; 713/600
[58] Field of Search .................................... 375/219, 257, 375/296, 354, 357, 369, 370, 295; 370/503, 509, 513; 714/800; 713/400, 500, 600

[56] References Cited

U.S. PATENT DOCUMENTS

| | | | |
|---|---|---|---|
| 4,694,294 | 9/1987 | Suzuki et al. | 375/369 |
| 5,363,418 | 11/1994 | Nakano et al. | 375/369 |
| 5,721,755 | 2/1998 | Kim et al. | 375/259 |

FOREIGN PATENT DOCUMENTS

| | | |
|---|---|---|
| 61-95648 | 5/1986 | Japan . |
| 61-201361 | 9/1986 | Japan . |
| 62-287736 | 12/1987 | Japan . |
| 63-190457 | 8/1988 | Japan . |
| 1-245737 | 9/1989 | Japan . |
| 4-78250 | 3/1992 | Japan . |

OTHER PUBLICATIONS

*Electric Engineering Handbook*, p. 1445, dated Feb. 28, 1988.

*Information and Communication Technical Handbook*, p. 166, dated Sep. 30,1989.

*Primary Examiner*—Amanda T. Le
*Attorney, Agent, or Firm*—Burns, Doane, Swecker & Mathis, LLP

[57] ABSTRACT

A data transmission unit having a clock generating circuit for generating a continuous transfer clock signal which is always output from the data transmission unit regardless of presence or absence of transmission and reception; a data converter for converting parallel data to serial data; and a data transfer circuit for transferring the serial data in synchronism with the transfer clock signal. It can achieve the transmission of the serial data at high speed and with high reliability.

12 Claims, 11 Drawing Sheets

DATA TRANSMISSION UNIT

BACKGROUND OF THE INVENTION

1. Field of the Invention

The present invention relates to a data transmission unit for transmitting data after converting parallel data into serial data.

2. Description of Related Art

FIG. 12 is a block diagram showing a conventional asynchronous data transmission unit 100 embedded in a 16-bit single chip microcomputer M310002, for example. In this figure, the reference numeral 101 designates a TXD transmitted data output port for transferring transmitted data to a receiver 120, and 102 designates a CTS (Clear To Send) handshake signal input port for inputting a ready to accept signal 107 (see, FIG. 13) from the receiver 120.

FIG. 13 is a timing diagram of the data transmission, in which the reference numeral 103 designates a start bit added to the head of transmitted data 104 output from the TXD transmitted data output port 101, 104 designates the transmitted data itself, 105 designates a parity bit bearing parity information of the transmitted data, and 106 designates a stop bit indicating the end of the transmitted data 104.

Next, the operation will be described.

The data transmission unit 100, receiving a LOW level signal, that is, the ready to accept signal 107 from the receiver 120 at the CTS handshake signal input port 102, recognizes that the receiver 120 is ready for receiving, receives parallel data from a CPU, and starts transfer of the transmitted data 104 from the TXD transmitted data output port 101.

The start bit 103 indicating the start of the data transmission is output in front of the transmitted data 104. Then, the transmitted data 104 is output, followed by the output of the parity bit 105 indicating the parity information of the transmitted data at its end. Finally, the stop bit 106 is output indicating the end of the data transmission after the parity bit 105, thereby informing the receiver 120 of the end of the transmission.

FIG. 14 is a block diagram showing a conventional synchronous data transmission unit 130 for transmitting data in synchronism with a transfer clock signal. In this figure, the reference numeral 108 designates a transfer clock output port from which a transfer clock signal is transmitted to the receiver 120. The transfer clock signal is supplied from a clock generator 109 activated by the ready to accept signal 107 received at the CTS handshake signal input port 102.

FIG. 15 is a timing diagram of the data transmission, in which the reference numeral 110 designates an enabling bit for setting both the transmitter/receiver to transmission/reception enabled states, 111 designates a detection signal indicating the presence/absence of the transmitted data to the data transmission unit 130, and 113 designates a transfer clock signal output from the transfer clock output port 108.

Next, the operation will be described.

When the enabling bit 110 changes to enable the transmission/reception, the data transmission unit 130 is supplied with parallel data from the CPU 112, and awaits the ready to accept signal 107 from the receiver 120, that is, awaits the CTS handshake signal input port 102 to be supplied with a LOW level signal. When the CTS handshake signal is input, the clock generator 109 is activated so that the transfer clock signal 113 is sent from the transfer clock output port 108 to the receiver 120. Thus, the start of transfer of the transmitted data 104 from the TXD transmitted data output port 101 is synchronized with the start of reception at the receiver by the CTS handshake signal and the transfer clock signal.

Related art to such a conventional synchronous data transmission unit as shown in FIG. 14 is disclosed in Japanese patent applications laid-open Nos. 61-95648 (1986), 1-245737 (1989), 62-287736 (1987), for example.

The conventional asynchronous data transmission unit as shown in FIG. 12 has a problem in that high-speed data transmission cannot be achieved because it is necessary for the receiver 120 to detect the center of each bit of the received signal by counting so that sampling of each bit of the received signal is adjusted to take place at the center of each bit, although the transmitted data is provided with the start bit 103, the parity bit 105 and the stop bit 106 to increase its reliability.

On the other hand, the conventional synchronous data transmission unit has a problem in that although its transmission rate is higher than that of the asynchronous data transmission unit as shown in FIG. 12, the synchronization between the transmitter and the receiver must be carried out, which is rather tedious.

SUMMARY OF THE INVENTION

The present invention is carried out to solve the foregoing problems, having an object to provide a data transmission unit that can achieve a highly reliable, fast data transmission without synchronizing the transmitter with the receiver.

According to a first aspect of the present invention, there is provided a data transmission unit comprising: clock generating means for generating a continuous transfer clock signal which is always output from the data transmission unit regardless of presence or absence of transmission and reception; data converting means for converting parallel data to serial data; and data transfer means for transferring the serial data in synchronism with the transfer clock signal. This makes it unnecessary to establish synchronization between a transmitter and a receiver, and makes fast data transmission possible.

Here, the data transfer means may add a code generated by a code generating means to the serial data to be transmitted. This ensures highly reliable data transmission.

The data transfer means may add a start code generated by start code generating means to the head of the serial data to be transmitted. This ensures the receiver to positively identify the beginning of the received data even if the data is transmitted in synchronism with the continuous clock signal output from the data transmission unit without interruption, which makes it possible to achieve highly reliable, fast data transmission.

The data transfer means may add a start code generated by start code generating means to the head of the serial data and a stop code generated by stop code generating means to the tail of the serial data to be transmitted. This ensures the receiver to positively identify the beginning and end of the received data even if the data is transmitted in synchronism with the continuous clock signal output without interruption, which makes it possible to achieve highly reliable, fast data transmission.

The data transfer means may add a parity code generated by parity code generating means to the serial data to be transmitted. This enables the parity of the serial data to be counted, which makes possible highly reliable, fast data transmission even if the data is transmitted in synchronism with the continuous clock signal output without interruption.

The data transfer means may add to the head of the serial data a start code generated by start code generating means, and may add to the tail of the serial data a parity code generated by parity code generating means and a stop code generated by a stop code generating means. This enables the parity of the serial data to be counted, and ensures a receiver to positively identify the beginning and end of the serial data even if the data is transmitted in synchronism with the continuous clock signal output without interruption, which makes possible highly reliable, fast data transmission.

According to a second aspect of the present invention, there is provided a data transmission unit comprising: clock generating means for generating a continuous transfer clock signal which is always output from the data transmission unit regardless of presence or absence of transmission and reception; data converting means for converting parallel data to serial data; transmission start decision means for making a decision of a start of data transmission in response to the transfer clock and ready to accept information sent from a receiver; and data transfer means for transferring the serial data in synchronism with the transfer clock signal in response to a decision signal from the transmission start decision means.

Here, the data transfer means may add a code generated by a code generating means to the serial data to be transmitted. This ensures highly reliable data transmission.

The data transfer means may add a stop code generated by stop code generating means to the tail of the serial data to be transmitted. This ensures the receiver to positively identify the end of the received data even if the data is transmitted in synchronism with the continuous clock signal output from the data transmission unit without interruption, which makes it possible to achieve highly reliable, fast data transmission.

The data transfer means may add a parity code generated by parity code generating means to the serial data to be transmitted. This enables the parity of the serial data to be counted, which makes possible highly reliable, fast data transmission even if the data is transmitted in synchronism with the continuous clock signal generated without interruption.

The data transfer means may add to the tail of the serial data a parity code generated by parity code generating means and a stop code generated by a stop code generating means. This enables the parity of the serial data to be counted, and ensures a receiver to positively identify the end of the serial data even if the data is transmitted in synchronism with the continuous clock signal generated without interruption, which makes possible highly reliable, fast data transmission.

DETAILED DESCRIPTION OF THE PREFERRED EMBODIMENTS

The invention will now be described with reference to the accompanying drawings.

Embodiment 1

Figure 1:
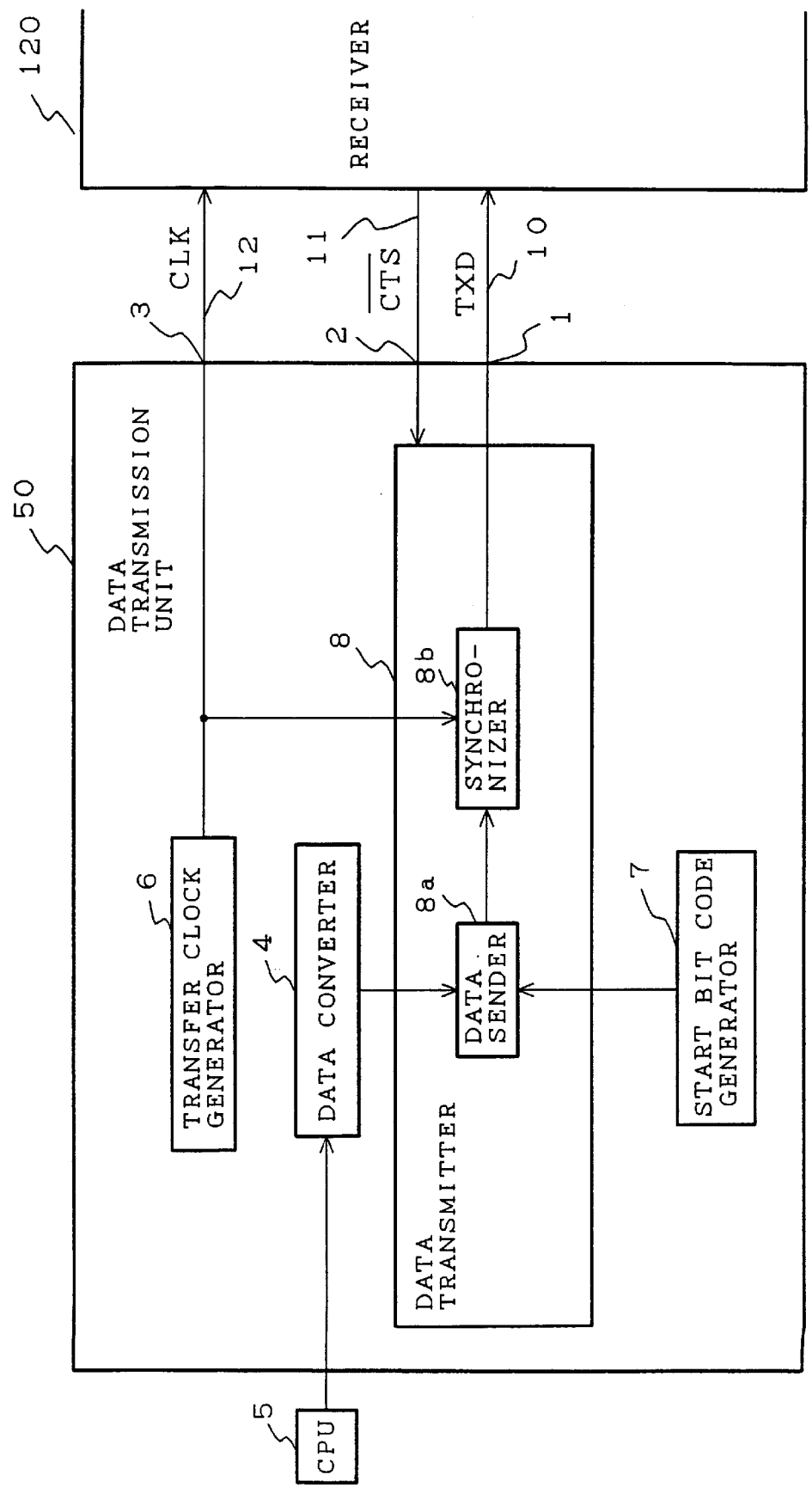
FIG. 1 is a block diagram showing an embodiment 1 of a data transmission unit in accordance with the present invention.

FIG. 1 is a block diagram showing an embodiment 1 of a data transmission unit 50 in accordance with the present invention. In this figure, the reference numeral 1 designates a TXD transmitted data output port from which transmitted data is transferred to the receiver 120; 2 designates a CTS handshake signal input port for inputting a ready to accept signal from the receiver 120; 3 designates a transfer clock output port from which a transfer clock signal is sent without interruption to the receiver 120; 4 designates a data converter (data converting means) for converting parallel data fed from an external CPU 5 into serial data (transmitted data); 6 designates a transfer clock signal generator (clock generating means) for generating the transfer clock signal which is always sent to the receiver 120 regardless of the presence or absence of the transmission or reception; and 7 designates a start bit code generator (start code generating means) for generating a code indicating start of the transmission, one of code generating means for generating codes to be added to the transmitted data.

The reference numeral 8 designates a data transmitter (data transmitting means) comprising a data sender 8a for adding the start code fed from the start bit code generator 7 to the transmitted data fed from the data converter 4, and a synchronizer (synchronizing means) 8b for synchronizing the transmission with the transfer clock signal fed from the transfer clock generator 6.

Figure 2:
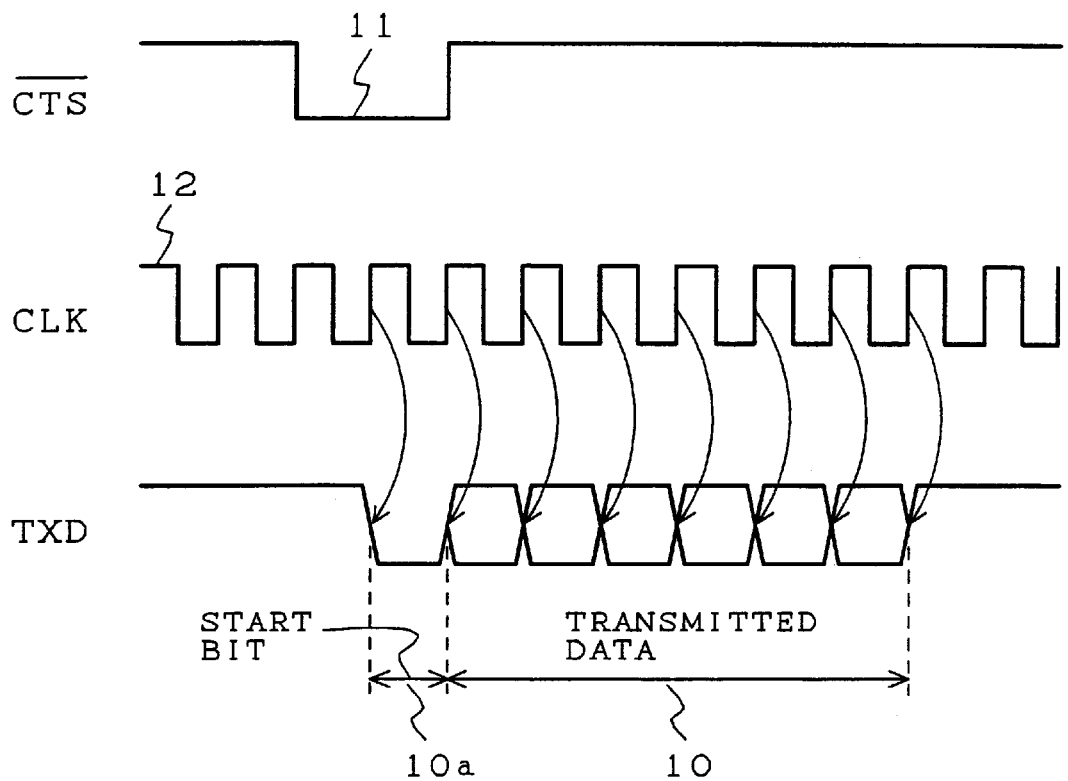
FIG. 2 is a timing diagram illustrating data transmission by the data transmission unit of FIG. 1.

FIG. 2 is a timing diagram illustrating the data transmission, in which the reference numeral 10 designates transmitted data output from the TXD transmitted data output port 1, and 10a designates a start bit added to the head of the transmitted data. The reference numeral 11 designates a ready to accept signal supplied to the CTS handshake signal input port 2 from the receiver 120, and 12 designates a transfer clock signal output from the transfer clock output port 3.

Next, the operation will be described.

The transfer clock generator 6 generates the continuous transfer clock signal 12 which is output from the data transmission unit regardless of the presence or absence of the transmission or reception before the start of the transfer of the transmitted data 10. The transfer clock signal 12 is sent from the transfer clock output port 3. When the ready to accept signal 11 of the LOW level is input to the CTS handshake signal input port 2 from the receiver 120 in the state the transfer clock signal 12 is being output, the data transmission unit 50 recognizes that the receiver 120 is ready to receive, and starts the transfer of the transmitted data 10 from the TXD transmitted data output port 1.

When the transfer begins, the data sender 8a controls such that the start bit 10a generated by the start bit code generator 7 is added to the head of the transmitted data 10, and transfers the transmitted data 10 following the start bit 10a. The transmitted data 10 is input to the synchronizer 8b, and is synchronized with the rising edges of the transfer clock signal 12 to be output. The receiver 120 recovers the transmitted data 10 in synchronism with the falling edges of the transfer clock signal 12 sent from the data transmission unit 50, and identifies the end of the data transmission by the end of the transmitted data 10.

Embodiment 2

Figure 3:
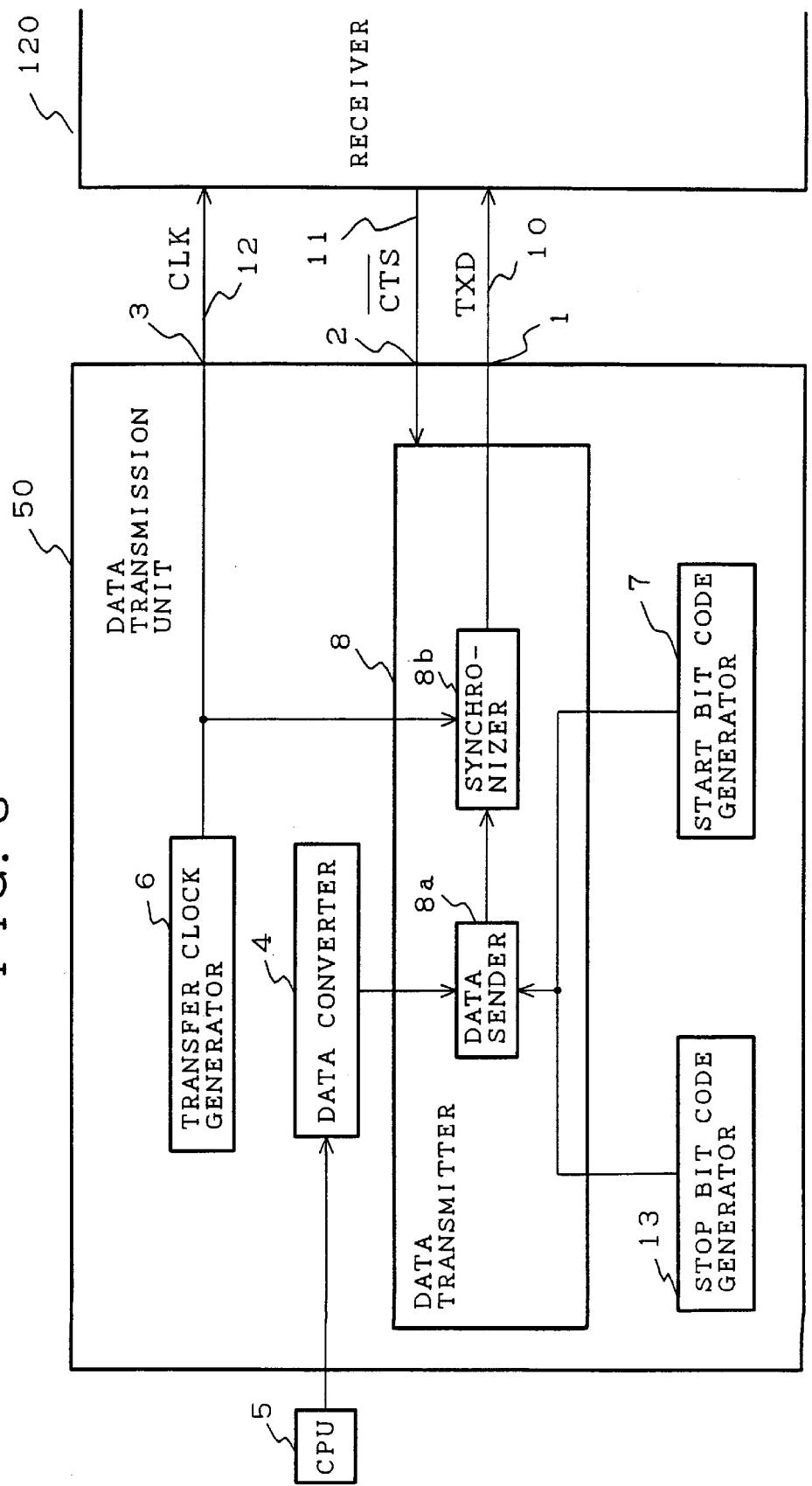
FIG. 3 is a block diagram showing an embodiment 2 of the data transmission unit in accordance with the present invention.

FIG. 3 is a block diagram showing an embodiment 2 of the data transmission unit 50 in accordance with the present invention. The embodiment 2 differs from the embodiment 1 in that it comprises, as stop code generating means, a stop bit code generator 13 for generating a code indicating the end of the transmitted data. In connection with this, the data sender 8a of the data transmitter 8 adds to the transmitted data fed from the data converter 4 the stop code fed from the stop bit code generator 13 besides the start code fed from the start bit code generator 7.

Figure 4:
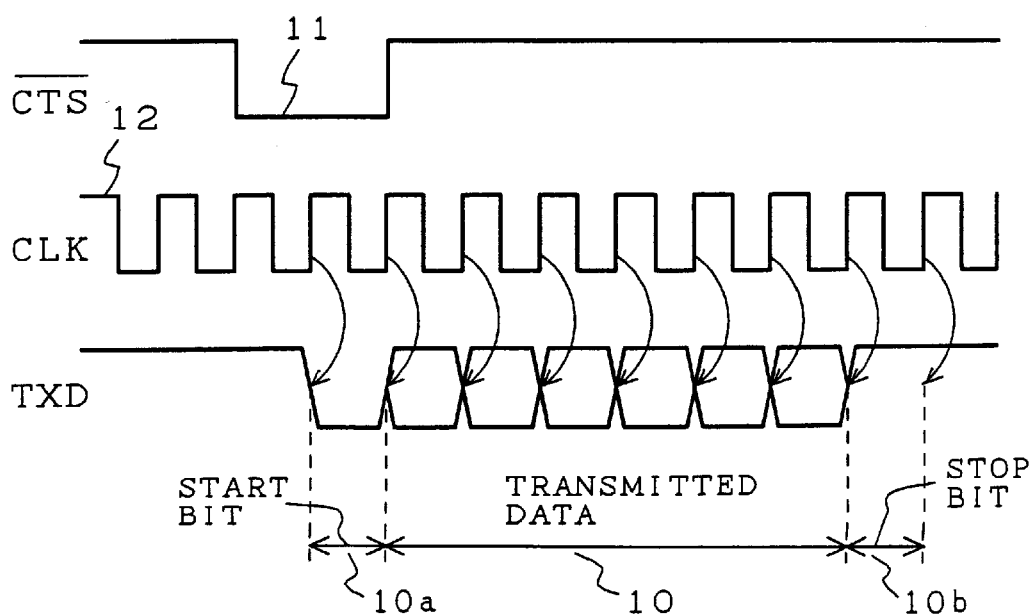
FIG. 4 is a timing diagram illustrating data transmission by the data transmission unit of FIG. 3.

FIG. 4 is a timing diagram of the data transmission, in which the reference numeral 10b designates a stop bit added to the tail of the transmitted data 10.

Next, the operation will be described.

The data transmission unit 50 transfers the start bit 10a and the transmitted data 10 in a manner similar to that of the embodiment 1. Specifically, it transfers the start bit 10a generated by the start bit code generator 7 by adding it to the head of the transmitted data 10 under the control of the data sender 8a, followed by the transfer of the transmitted data 10. Besides, the present embodiment 2 transfers the stop bit 10b indicating the end of the transmitted data by adding it to the end of the transmitted data. The transmitted data 10 is input to the synchronizer 8b to be output in synchronism with the rising edges of the transfer clock signal 12. The receiver, on the other hand, recovers the transmitted data in synchronism with the falling edges of the transfer clock signal 12. It also identifies the end of the data transmission by the stop bit 10b added to the tail of the transmitted data 10.

Embodiment 3

Figure 5:
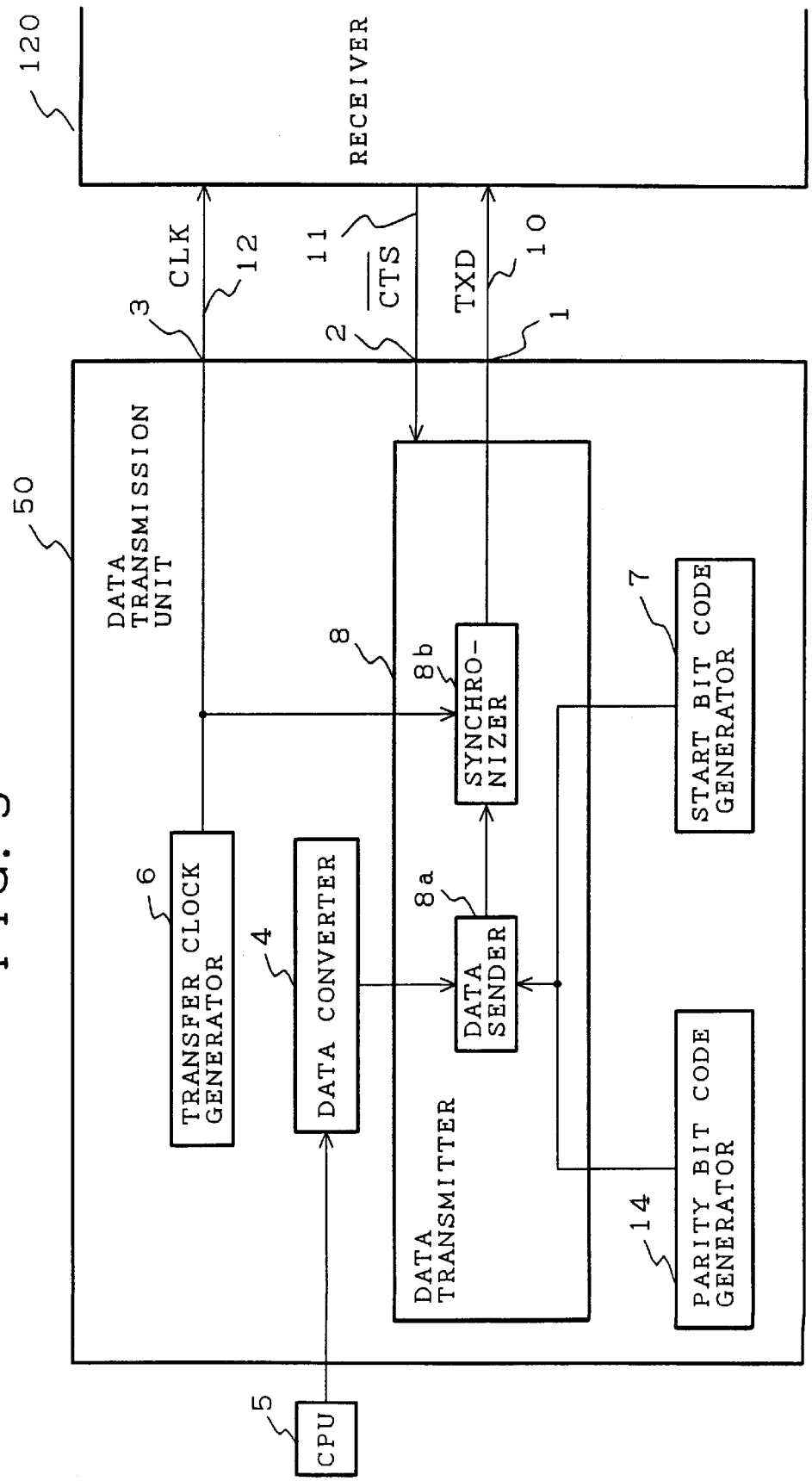
FIG. 5 is a block diagram showing an embodiment 3 of the data transmission unit in accordance with the present invention.

FIG. 5 is a block diagram showing an embodiment 3 of the data transmission unit 50 in accordance with the present invention. The embodiment 3 differs from the embodiment 1 in that it comprises, as parity code generating means, a parity bit code generator 14 for generating a code bearing the parity information of the transmitted data. In connection with this, the data sender 8a of the data transmitter 8 adds to the transmitted data fed from the data converter 4 the parity bit fed from the parity bit code generator 14 besides the start code fed from the start bit code generator 7.

Figure 6:
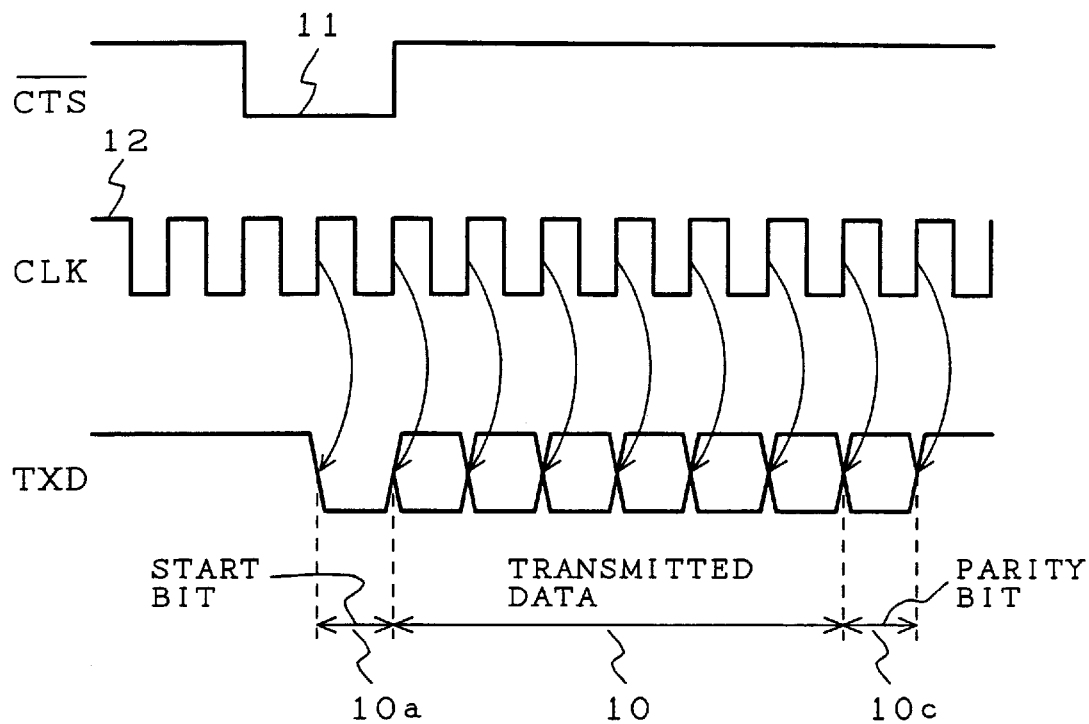
FIG. 6 is a timing diagram illustrating data transmission by the data transmission unit of FIG. 5.

FIG. 6 is a timing diagram of the data transmission, in which the reference numeral 10c designates a parity bit added to the tail of the transmitted data 10.

Next, the operation will be described.

The data transmission unit 50 transfers the start bit 10a and the transmitted data 10 in a manner similar to that of the embodiment 1. Specifically, it transfers the start bit 10a generated by the start bit code generator 7 by adding it to the head of the transmitted data 10 under the control of the data sender 8a, followed by the transfer of the transmitted data 10. Besides, the present embodiment 3 transfers the parity bit 10c bearing the parity information of the transmitted data by adding it to the end of the transmitted data. The transmitted data 10 and the parity bit 10c are input to the synchronizer 8b to be output in synchronism with the rising edges of the transfer clock signal 12. The receiver, on the other hand, recovers the transmitted data in synchronism with the falling edges of the transfer clock signal 12. It also identifies the end of the data transmission by the end of the transmitted data 10.

Embodiment 4

Figure 7:
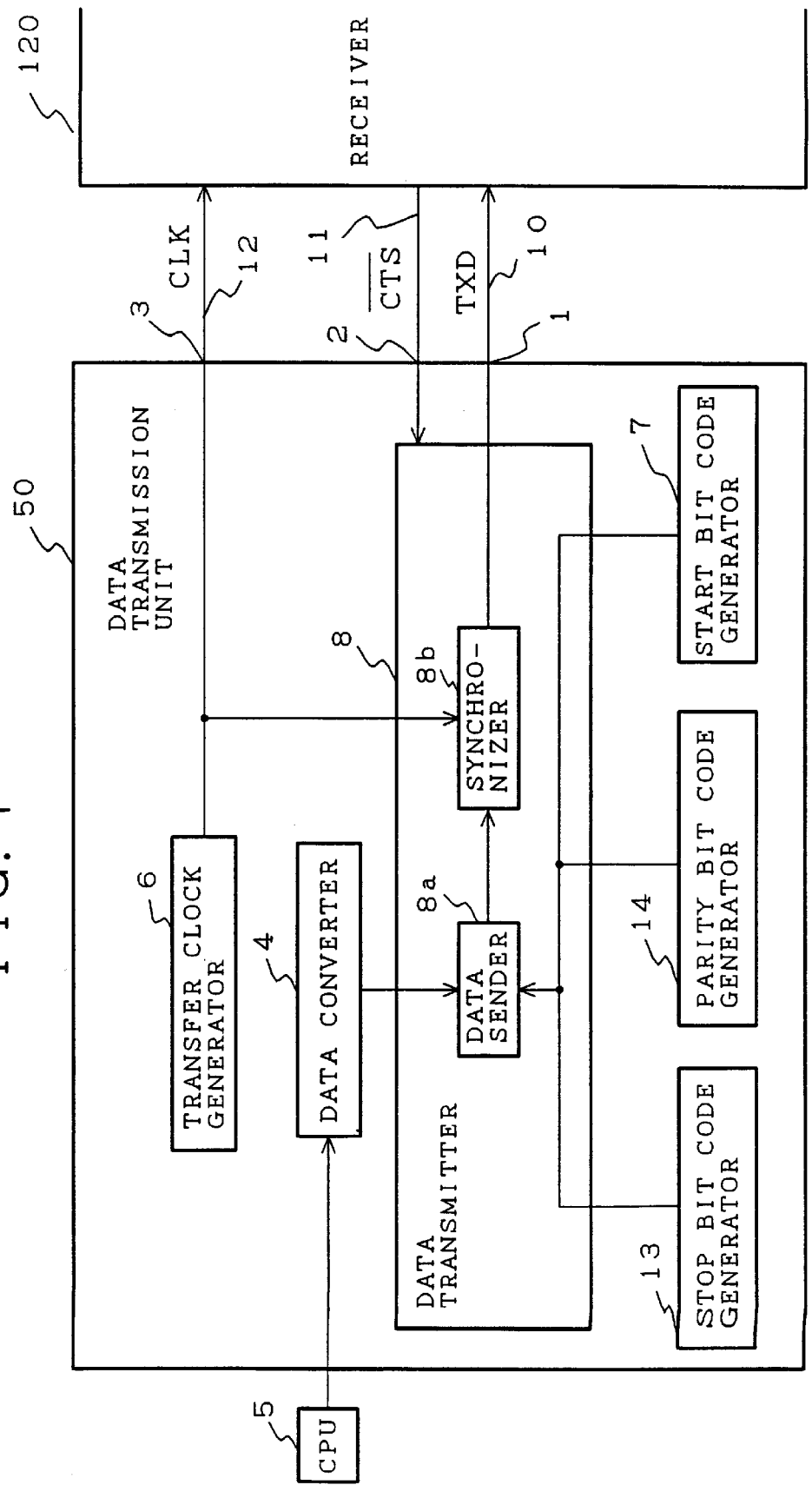
FIG. 7 is a block diagram showing an embodiment 4 of the data transmission unit in accordance with the present invention.

FIG. 7 is a block diagram showing an embodiment 4 of the data transmission unit 50 in accordance with the present invention. The embodiment 4 differs from the embodiment 3 as shown in FIG. 5 in that it comprises, as stop code generating means, a stop bit code generator 13 for generating a code indicating the end of the transmitted data. In connection with this, the data sender 8a of the data transmitter 8 adds to the transmitted data fed from the data converter 4 the start code fed from the start bit code generator 7, the parity bit fed from the parity bit code generator 14, and the stop code fed from the stop bit code generator 13.

Figure 8:
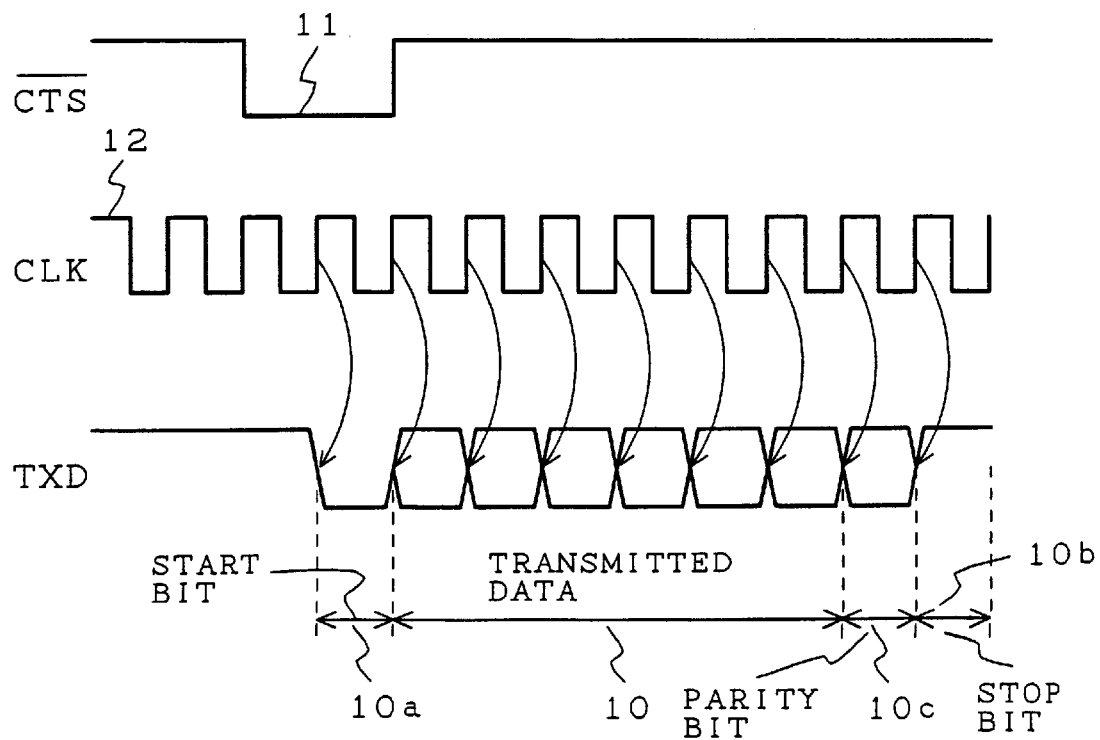
FIG. 8 is a timing diagram illustrating data transmission by the data transmission unit of FIG. 7.

FIG. 8 is a timing diagram of the data transmission, in which the reference numeral 10c designates a parity bit, and 10b designates a stop bit added to the end of the parity bit.

Next, the operation will be described.

The data transmission unit 50 transfers the start bit 10a, the transmitted data 10 and the parity bit 10c in a manner similar to that of the embodiment 3. Specifically, it transfers the start bit 10a generated by the start bit code generator 7 by adding it to the head of the transmitted data 10 under the control of the data sender 8a, followed by the transfer of the transmitted data 10 and the parity bit 10c, and finally transfers the stop bit 10b indicating the end of the transmitted data. These data to be transmitted are input to the synchronizer 8b to be output in synchronism with the rising edges of the transfer clock signal 12. The receiver, on the other hand, recovers the transmitted data 10 in synchronism with the falling edges of the transfer clock signal 12. It also identifies the end of the data transmission by the stop bit 10b added to the tail of the transmitted data 10.

Embodiment 5

Figure 9:
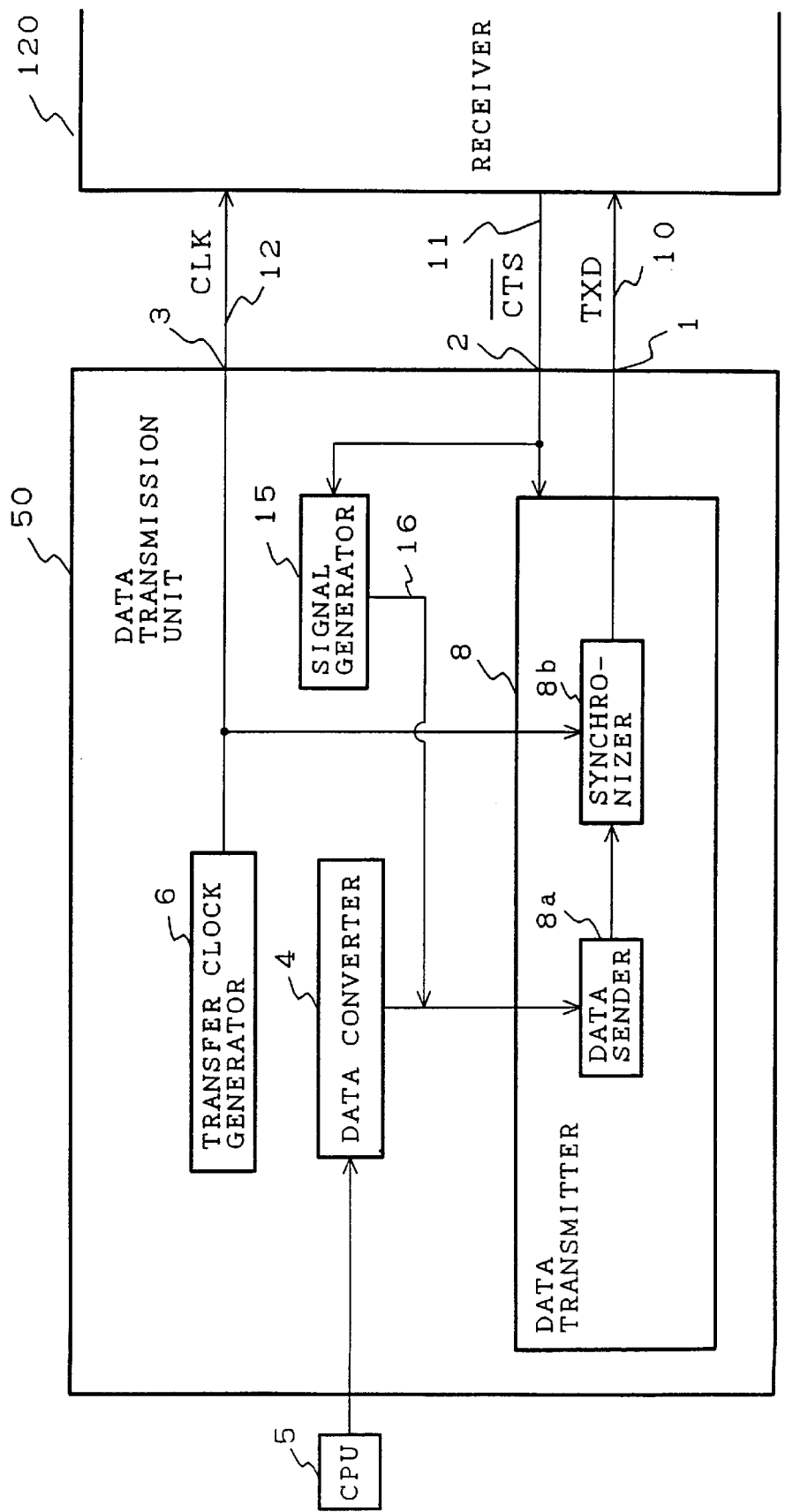
FIG. 9 is a block diagram showing an embodiment 5 of the data transmission unit in accordance with the present invention.

FIG. 9 is a block diagram showing an embodiment 5 of the data transmission unit 50 in accordance with the present invention. The embodiment 5 differs from the embodiment 1 as shown in FIG. 1 in that it is deprived of the start bit code generator 7, and is provide with a signal generator 15. The signal generator 15 functions as transmission start decision means for making decision of the start of the transmission when the CTS handshake signal and the transfer clock signal are input at the same time. In connection with this, the data sender 8a of the data transmitter 8, receiving a transmission start signal 16 from the signal generator 15, transfers the transmitted data from the data converter 4.

Figure 10:
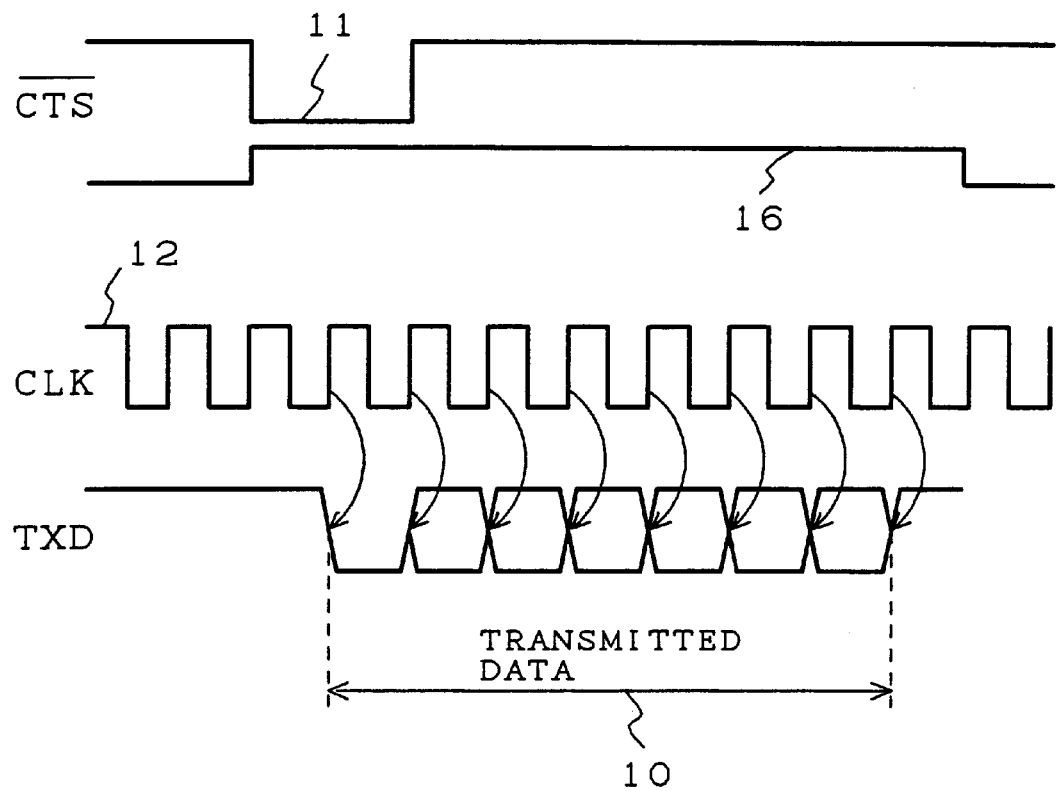
FIG. 10 is a timing diagram illustrating data transmission by the data transmission unit of FIG. 9.
Figure 14:
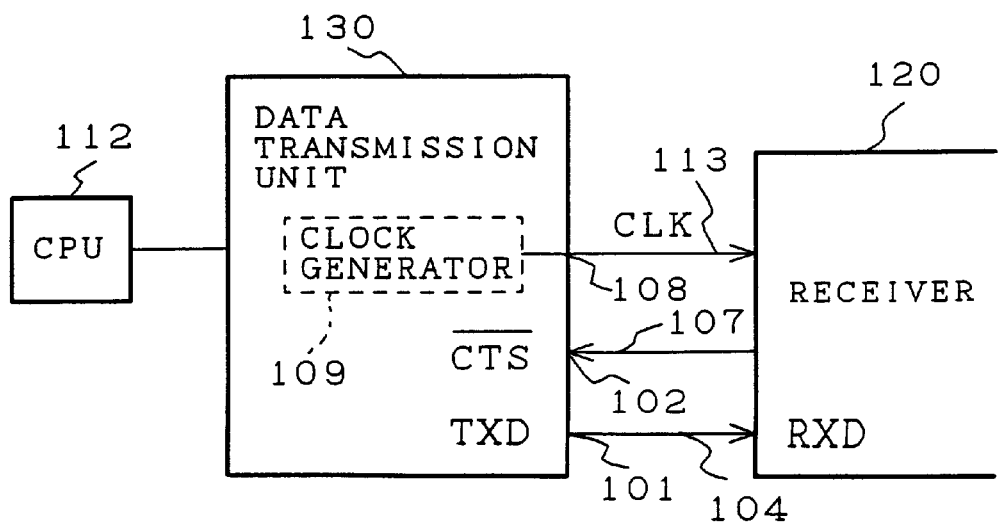
FIG. 14 is a block diagram showing a conventional synchronous data transmission unit.

FIG. 10 is a timing diagram illustrating the data transmission, in which the reference numeral 16 designates the transmission start signal output from the signal generator 15.

Next, the operation will be described.

The transfer clock generator 6 generates the continuous transfer clock signal 12 which is output from the data transmission unit without interruption prior to the data transmission, regardless of the presence or absence of the transmission or reception. The transfer clock signal 12 is sent from the transfer clock output port 3. When a LOW level signal, that is, the ready to accept signal 11 is input to the CTS handshake signal input port 2 while the transfer clock signal 12 is being output, the signal generator 15 outputs the transmission start signal 16 at the simultaneous occurrence of the CTS handshake signal and the transfer clock signal. Receiving the transmission start signal 16, the data sender 8a starts to send from the TXD transmitted data output port 1 the data fed from the data converter 4 to the data sender 8a, in which the transmitted data is synchronized with the rising edges of the transfer clock signal 12 by the synchronizer 8b. The receiver, on the other hand, recovers the transmitted data 10 in synchronism with the falling edges of the transfer clock signal 12. In addition, it can identify the end of the data transmission by the end of the transmitted data 10.

Embodiment 6

Figure 11:
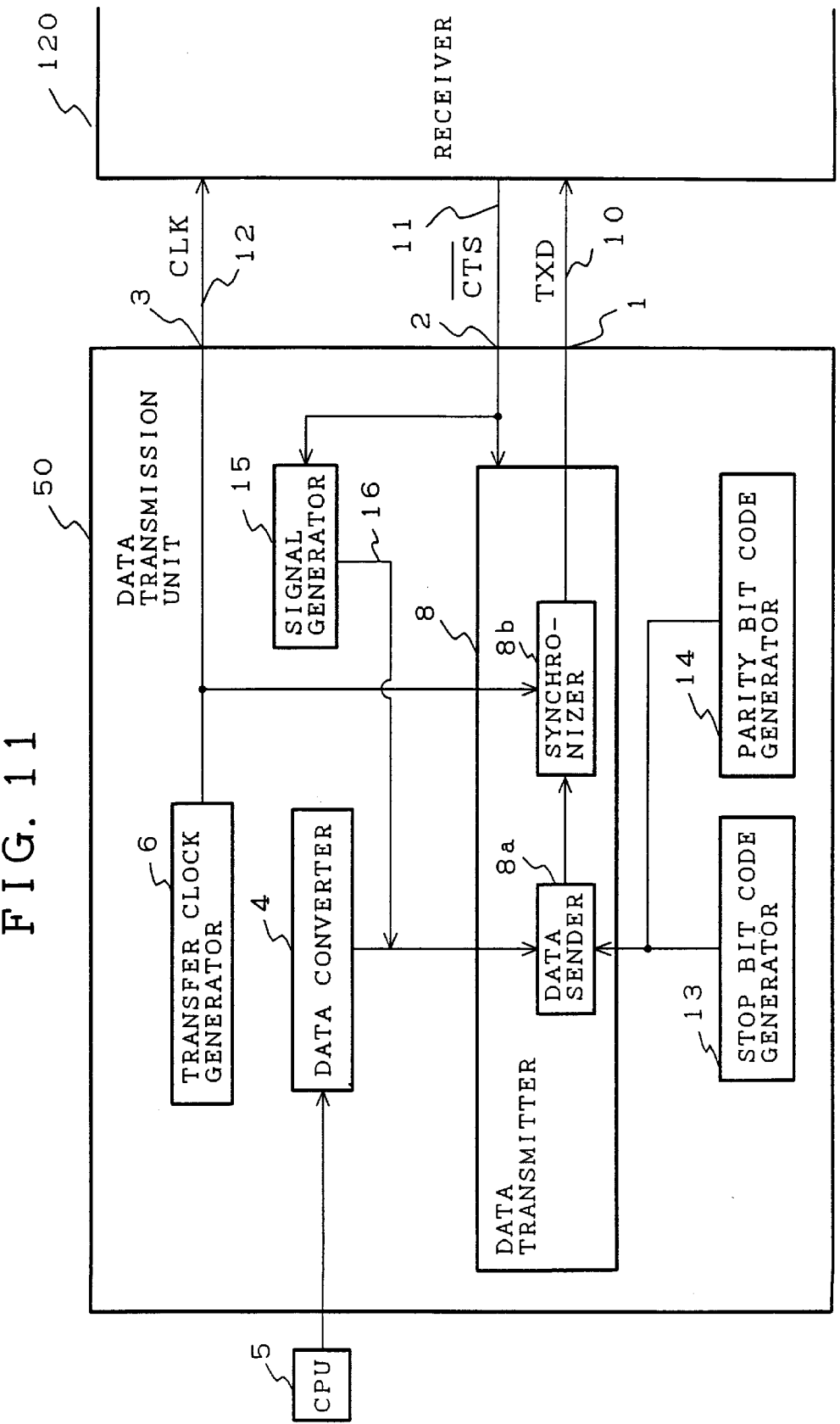
FIG. 11 is a block diagram showing an embodiment 6 of the data transmission unit in accordance with the present invention.
Figure 12:
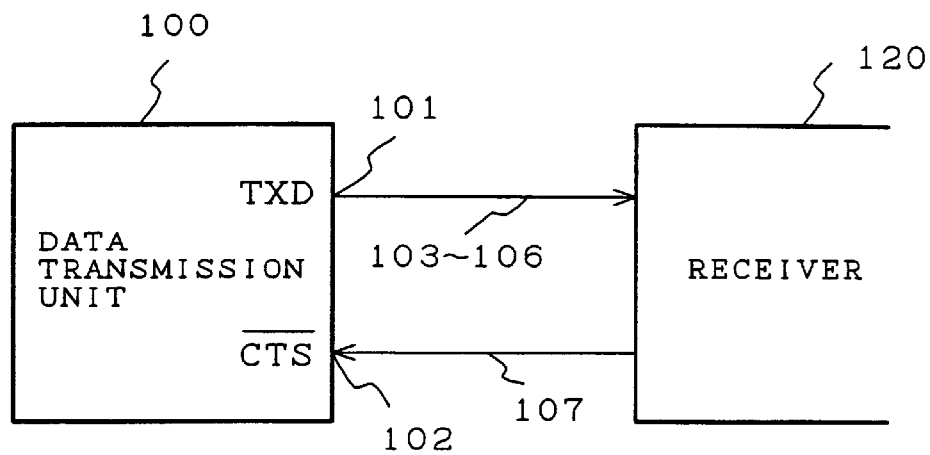
FIG. 12 is a block diagram showing a conventional asynchronous data transmission unit.
Figure 13:
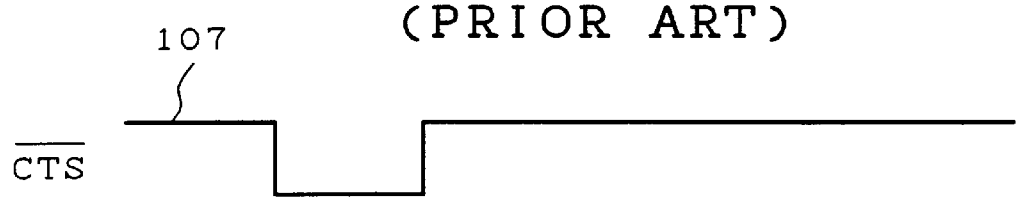
FIG. 13 is a timing diagram illustrating data transmission by the conventional asynchronous data transmission unit.
Figure 13:
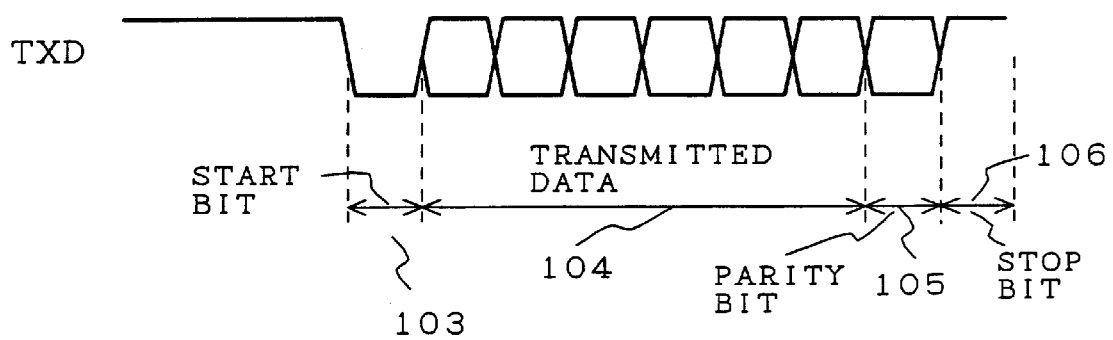
Figure 15:
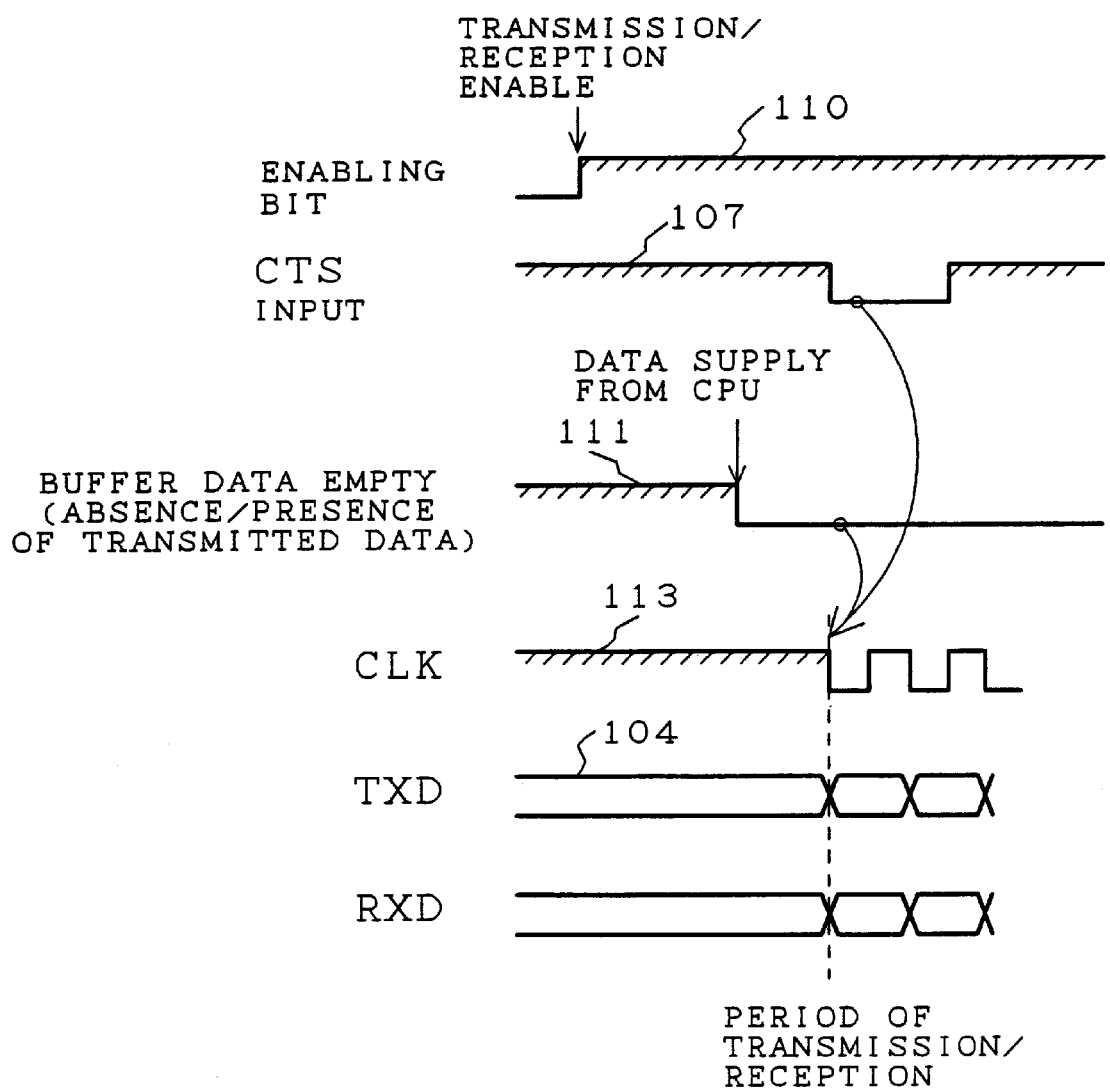
FIG. 15 is a timing diagram illustrating data transmission by the conventional synchronous data transmission unit.

FIG. 11 is a block diagram showing an embodiment 6 of the data transmission unit in accordance with the present invention. The embodiment 6 differs from the embodiment 5 in that it comprises the stop bit code generator 13 and the parity bit code generator 14 so that it can also transfer the stop bit code and/or parity bit code together with the transmitted data as in the foregoing embodiments 1–4.

What is claimed is:

1. A data transmission unit comprising:
   clock generating means for generating a continuous transfer clock signal which is always output from the data transmission unit regardless of presence or absence of transmission and reception;
   data converting means for converting parallel data to serial data; and
   data transfer means for transferring said serial data in synchronism with said transfer clock signal.

2. The data transmission unit as claimed in claim 1, further comprising code generating means for generating a code to be added to said serial data, wherein said data transfer means adds said code generated by said code generating means to said serial data to be transmitted.

3. The data transmission unit as claimed in claim 1, further comprising start code generating means for generating a start code indicating a beginning of transmission of said serial data, wherein said data transfer means adds said start code to a head of said serial data to be transmitted.

4. The data transmission unit as claimed in claim 1, further comprising start code generating means for generating a start code indicating a beginning of transmission of said serial data, and stop code generating means for generating a stop code indicating an end of transmission of said serial data, wherein said data transfer means adds said start code to a head of said serial data and said stop code to a tail of said serial data to be transmitted.

5. The data transmission unit as claimed in claim 1, further comprising parity code generating means for generating a parity code bearing parity information of said serial data, wherein said data transfer means adds said parity code to said serial data to be transmitted.

6. The data transmission unit as claimed in claim 1, further comprising start code generating means for generating a start code indicating a start of transmission of said serial data, parity code generating means for generating a parity code bearing parity information of said serial data, and stop code generating means for generating a stop code indicating an end of transmission of said serial data, wherein said data transfer means adds said start code to a head of said serial data and adds said parity code and said stop code to a tail of said serial data to be transmitted.

7. The data transmission unit as claimed in claim 1, wherein said data transfer means transfers said serial data responsive to receipt of a ready to accept signal from a receiver.

8. A data transmission unit comprising:
   clock generating means for generating a continuous transfer clock signal which is always output from the data transmission unit regardless of presence or absence of transmission and reception;
   data converting means for converting parallel data to serial data;
   transmission start decision means for making a decision of a start of data transmission in response to said transfer clock and ready to accept information sent from a receiver; and
   data transfer means for transferring said serial data in synchronism with said transfer clock signal in response to a decision signal from said transmission start decision means.

9. The data transmission unit as claimed in claim 8, further comprising code generating means for generating a code to be added to said serial data, wherein said data transfer means adds said code generated by said code generating means to said serial data to be transmitted.

10. The data transmission unit as claimed in claim 8, further comprising stop code generating means for generating a stop code indicating an end of transmission of said serial data, wherein said data transfer means adds said stop code to a tail of said serial data to be transmitted.

11. The data transmission unit as claimed in claim 8, further comprising parity code generating means for generating a parity code bearing parity information of said serial data, wherein said data transfer means adds said parity code to said serial data to be transmitted.

12. The data transmission unit as claimed in claim 8, further comprising parity code generating means for generating a parity code bearing parity information of said serial data, and stop code generating means for generating a stop code indicating an end of transmission of said serial data, wherein said data transfer means adds said parity code and said stop code to a tail of said serial data to be transmitted.

* * * * *